(12) United States Patent
Watanabe et al.

(10) Patent No.: US 11,443,153 B2
(45) Date of Patent: Sep. 13, 2022

(54) CONVEYANCE CONTROL SYSTEM, NON-TRANSITORY COMPUTER-READABLE MEDIUM STORING COMPUTER-READABLE INSTRUCTIONS, AND CONVEYANCE CONTROL DEVICE

(71) Applicant: BROTHER KOGYO KABUSHIKI KAISHA, Nagoya (JP)

(72) Inventors: Takeshi Watanabe, Nagoya (JP); Shuichi Tamaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/212,807

(22) Filed: Mar. 25, 2021

(65) Prior Publication Data

US 2021/0303942 A1    Sep. 30, 2021

(30) Foreign Application Priority Data

Mar. 30, 2020 (JP) .............................. JP2020-059777

(51) Int. Cl.
*G06K 15/02* (2006.01)
*G06K 15/16* (2006.01)
(Continued)

(52) U.S. Cl.
CPC ........... *G06K 15/16* (2013.01); *G06K 15/002* (2013.01); *G06K 15/021* (2013.01)

(58) Field of Classification Search
None
See application file for complete search history.

(56) References Cited

U.S. PATENT DOCUMENTS

| 2011/0236111 | A1* | 9/2011 | Fujii | .................... G03G 15/238 400/583 |
| 2015/0273866 | A1 | 10/2015 | Sakai | |
| 2019/0366740 | A1 | 12/2019 | Watanabe et al. | |

FOREIGN PATENT DOCUMENTS

| CN | 110271855 | * | 9/2019 | ......... G06K 17/0029 |
| EP | 2744319 | * | 6/2014 | ............. H05K 13/00 |

(Continued)

OTHER PUBLICATIONS

Ruml et al, "On-line Planning and Scheduling: An Application to Controlling Modular Printers", Feb. 2011, Journal of Artificial Intelligence Research, vol. 40, pp. 415-468, (Year: 2011).*

(Continued)

*Primary Examiner* — Beniyam Menberu
(74) *Attorney, Agent, or Firm* — K&L Gates LLP

(57) ABSTRACT

A conveyance control system is provided with a conveyance mechanism that conveys a platen, a printer provided in the conveyance mechanism and capable of performing printing on a print medium held by the platen received from the conveyance mechanism, and a PC that is communicably connected to the printer and controls the conveyance mechanism. A storage of the PC stores identification information of the printer and identification information of the conveyance mechanism in association with each other. The PC acquires the identification information of the conveyance mechanism associated with the identification information of the printer. A CPU of the PC causes the platen to be conveyed by the conveyance mechanism, on the basis of the acquired identification information.

11 Claims, 9 Drawing Sheets

(51) Int. Cl.
  *G06F 3/12* (2006.01)
  *G06K 15/00* (2006.01)

(56) References Cited

FOREIGN PATENT DOCUMENTS

| | | |
|---|---|---|
| JP | 2007-220047 A | 8/2007 |
| JP | 2009-146050 A | 7/2009 |
| JP | 2015-183331 A | 10/2015 |

OTHER PUBLICATIONS

Extended European Search Report dated Aug. 27, 2021 in the corresponding European Patent Application No. 21164885.2.

\* cited by examiner

F I G. 3

| INDEX | PRINTER IDENTIFICATION INFORMATION | CONVEYANCE IDENTIFICATION INFORMATION | | PRETREATMENT DEVICE IDENTIFICATION INFORMATION | POST-TREATMENT DEVICE IDENTIFICATION INFORMATION |
|---|---|---|---|---|---|
| | | LANE IDENTIFICATION INFORMATION | MECHANISM IDENTIFICATION INFORMATION | | |
| 1 | 192.168.10.30 | 81 | 91A | 192.168.10.50 | 192.168.10.60 |
| 2 | 192.168.10.31 | | 92A | | |
| 3 | 192.168.10.32 | | 93A | | |
| 4 | 192.168.10.33 | 82 | 91B | 192.168.10.51 | 192.168.10.61 |
| 5 | 192.168.10.34 | | 92B | | |
| 6 | 192.168.10.35 | | 93B | | |
| 7 | 192.168.10.36 | 83 | 91C | 192.168.10.52 | 192.168.10.62 |
| 8 | 192.168.10.37 | | 92C | | |
| 9 | 192.168.10.38 | | 93C | | |
| 10 | 192.168.10.39 | 84 | 91D | 192.168.10.53 | 192.168.10.63 |
| 11 | 192.168.10.40 | | 92D | | |
| 12 | 192.168.10.41 | | 93D | | |

54A

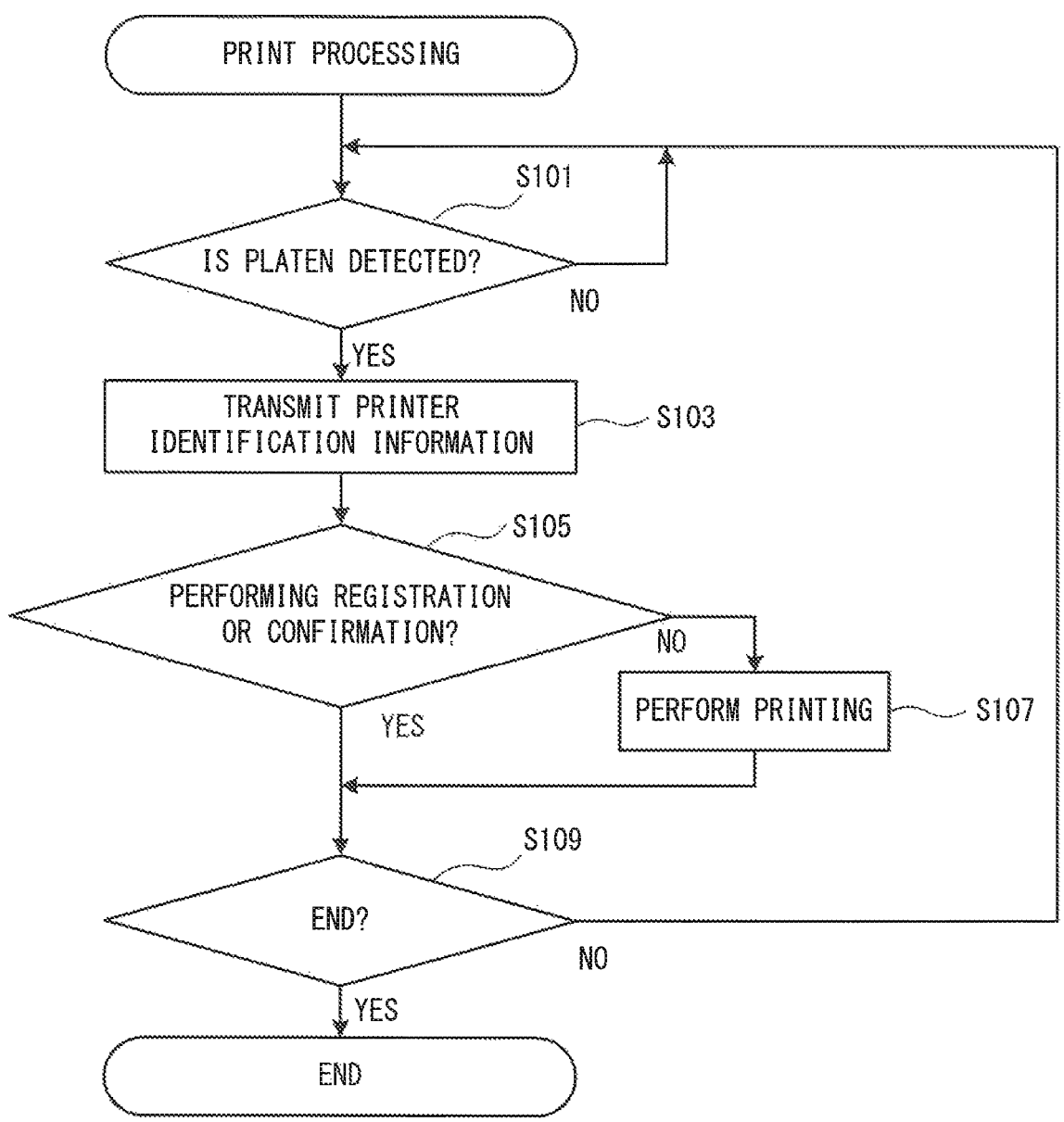

CONVEYANCE CONTROL SYSTEM, NON-TRANSITORY COMPUTER-READABLE MEDIUM STORING COMPUTER-READABLE INSTRUCTIONS, AND CONVEYANCE CONTROL DEVICE

CROSS-REFERENCE TO RELATED APPLICATION

This application claims priority to Japanese Patent Application No. 2020-59777 filed Mar. 30, 2020. The contents of the foregoing application are hereby incorporated herein by reference.

BACKGROUND

The present disclosure relates to a conveyance control system, a non-transitory computer-readable medium storing computer-readable instructions, and a conveyance control device.

When processing, such as printing, is performed on a target object, in some cases, pretreatment is performed in a preceding process of the processing or post-treatment is performed in a subsequent process of the processing. A fabric printing device that includes a pretreatment agent application portion and a press portion that perform the pretreatment, a printing liquid ejection portion that performs printing, and a heater that performs the post-treatment is known. The fabric printing device conveys a tray, on which a medium to be printed is arranged, to the pretreatment agent application portion, the press portion, the printing liquid ejection portion, and the heater, in that order. The pretreatment agent application portion applies the pretreatment agent onto the medium to be printed. The press portion compresses the medium to be printed onto which the pretreatment agent has been applied, while heating the medium to be printed, and thus dries the pretreatment agent. The printing liquid ejection portion ejects the printing liquid onto the medium to be printed, and prints an image. The heater heats the medium to be printed onto which the printing liquid has been ejected.

SUMMARY

In order to efficiently perform the processing, such as the printing, on a plurality of target objects after the pretreatment, a system is conceivable in which a plurality of processing devices are disposed latterly to a device that performs the pretreatment. In this system, it is required to convey the target object after the pretreatment to a processing device to be used for the processing, among the plurality of processing devices. When conveyance paths are individually provided that can convey the target object after the pretreatment to each of the plurality of processing devices, it is necessary for the system to select the conveyance path to convey the target object to the processing device to be used for the processing. For this selection control, it is necessary for the processing device to be used for the processing to be associated with the conveyance path that can convey the target object to the processing device to be used for the processing, and to be recognized.

Embodiments of the broad principles derived herein provide a conveyance control system, a non-transitory computer-readable medium storing computer-readable instructions, and a conveyance control device that are capable of conveying a print medium to a printer to be used for printing, or capable of conveying a target object to a processing device to be used for processing.

A conveyance control system according to a first aspect of the present disclosure includes a first conveyance mechanism and a second conveyance mechanism configured to convey a platen, a first printer provided in the first conveyance mechanism and configured to perform printing on a print medium held by the platen conveyed by the first conveyance mechanism, a second printer provided in the second conveyance mechanism and configured to perform printing on the print medium held by the platen conveyed by the second conveyance mechanism, a conveyance controller communicably connected to the first printer and the second printer on the basis of a predetermined communication protocol, and configured to control the first conveyance mechanism and the second conveyance mechanism, and a storage configured to store first printer identification information and first conveyance identification information in association with each other, and to store second printer identification information and second conveyance identification information in association with each other, the first printer identification information being configured to identify the first printer on the basis of the communication protocol, the first conveyance identification information being configured to identify the first conveyance mechanism, the second printer identification information being configured to identify the second printer on the basis of the communication standard, and the second conveyance identification information being configured to identify the second conveyance mechanism. When the first printer performs the printing, the conveyance controller acquires, from the storage, the first conveyance identification information associated with the first printer identification information, and causes the first conveyance mechanism to convey the platen on the basis of the acquired first conveyance identification information. When the second printer performs the printing, the conveyance controller acquires, from the storage, the second conveyance identification information associated with the second printer identification information, and causes the second conveyance mechanism to convey the platen on the basis of the acquired second conveyance identification information.

A non-transitory computer-readable medium storing computer-readable instructions according to a second aspect of the present disclosure is a medium executed by a computer, the computer being communicably connected to a first processing device and a second processing device on the basis of a predetermined communication protocol, and controlling the first conveyance mechanism and the second conveyance mechanism, the first processing device being a processing device provided in a first conveyance mechanism conveying a holding portion holding a target object and being configured to perform processing on the target object held by the holding portion conveyed by the first conveyance mechanism, and the second processing device being the processing device provided in a second conveyance mechanism conveying the holding portion and being configured to perform processing on the target object held by the holding portion conveyed by the second conveyance mechanism, the instructions, when executed by the computer, causing the computer to perform processes including: acquiring, when the first processing device performs processing, first conveyance identification information associated with first processing device identification information, from a storage, and causing the first conveyance mechanism to convey the holding portion on the basis of the acquired first conveyance identification information, the storage storing the first processing device identification information configured to identify the first processing device on the basis of the communication protocol in association with the first conveyance identification information configured to identify the first conveyance mechanism, and storing second processing device identification information configured to identify the second processing device on the basis of the communication protocol in association with second conveyance identification information configured to identify the second conveyance mechanism; and acquiring, when the second processing device performs processing, the second conveyance identification information associated with the second processing device identification information, from the storage, and causing the second conveyance mechanism to convey the holding portion on the basis of the acquired second conveyance identification information.

A conveyance control device according to a third aspect of the present disclosure is a conveyance control device communicably connected to a first processing device and a second processing device on the basis of a predetermined communication protocol, and controls a first conveyance mechanism and a second conveyance mechanism, the first processing device being a processing device provided in the first conveyance mechanism conveying a holding portion holding a target object and being configured to perform processing on the target object held by the holding portion conveyed by the first conveyance mechanism, and the second processing device being the processing device provided in the second conveyance mechanism conveying the holding portion, and being configured to perform processing on the target object held by the holding portion conveyed by the second conveyance mechanism. The conveyance control device performs processes including: acquiring, when the first processing device performs processing, first conveyance identification information associated with first processing device identification information, from a storage, and causing the first conveyance mechanism to convey the holding portion on the basis of the acquired first conveyance identification information, the storage storing the first processing device identification information configured to identify the first processing device on the basis of the communication protocol in association with the first conveyance identification information configured to identify the first conveyance mechanism and storing second processing device identification information configured to identify the second processing device on the basis of the communication protocol in association with second conveyance identification information configured to identify the second conveyance mechanism; and acquiring, when the second processing device performs processing, the second conveyance identification information associated with the second processing device identification information, from the storage, and causing the second conveyance mechanism to convey the holding portion on the basis of the acquired second conveyance identification information.

According to the first to the third aspects of the present disclosure, based on the printer identification information and the conveyance identification information stored in the storage in association with each other, the first conveyance mechanism can be determined as the conveyance mechanism for conveying the platen to the first printer, and the second conveyance mechanism can be determined as the conveyance mechanism for conveying the platen to the second printer. Therefore, by conveying the platen with the determined conveyance mechanism, the print medium can be conveyed to the printer to be used for printing. Further, based on the processing device identification information and the conveyance identification information stored in the storage in association with each other, the first conveyance mechanism can be determined as the conveyance mechanism for conveying the platen to the first processing device, and the second conveyance mechanism can be determined as the conveyance mechanism for conveying the platen to the second processing device. Therefore, by conveying the platen with the determined conveyance mechanism, the target object can be conveyed to the processing device to be used for the processing.

BRIEF DESCRIPTION OF THE DRAWINGS

Embodiments will be described below in detail with reference to the accompanying drawings in which:

FIG. 3 is a diagram showing a table 54A;

FIG. 9 is a flowchart of print processing.

DETAILED DESCRIPTION

Figure 1:
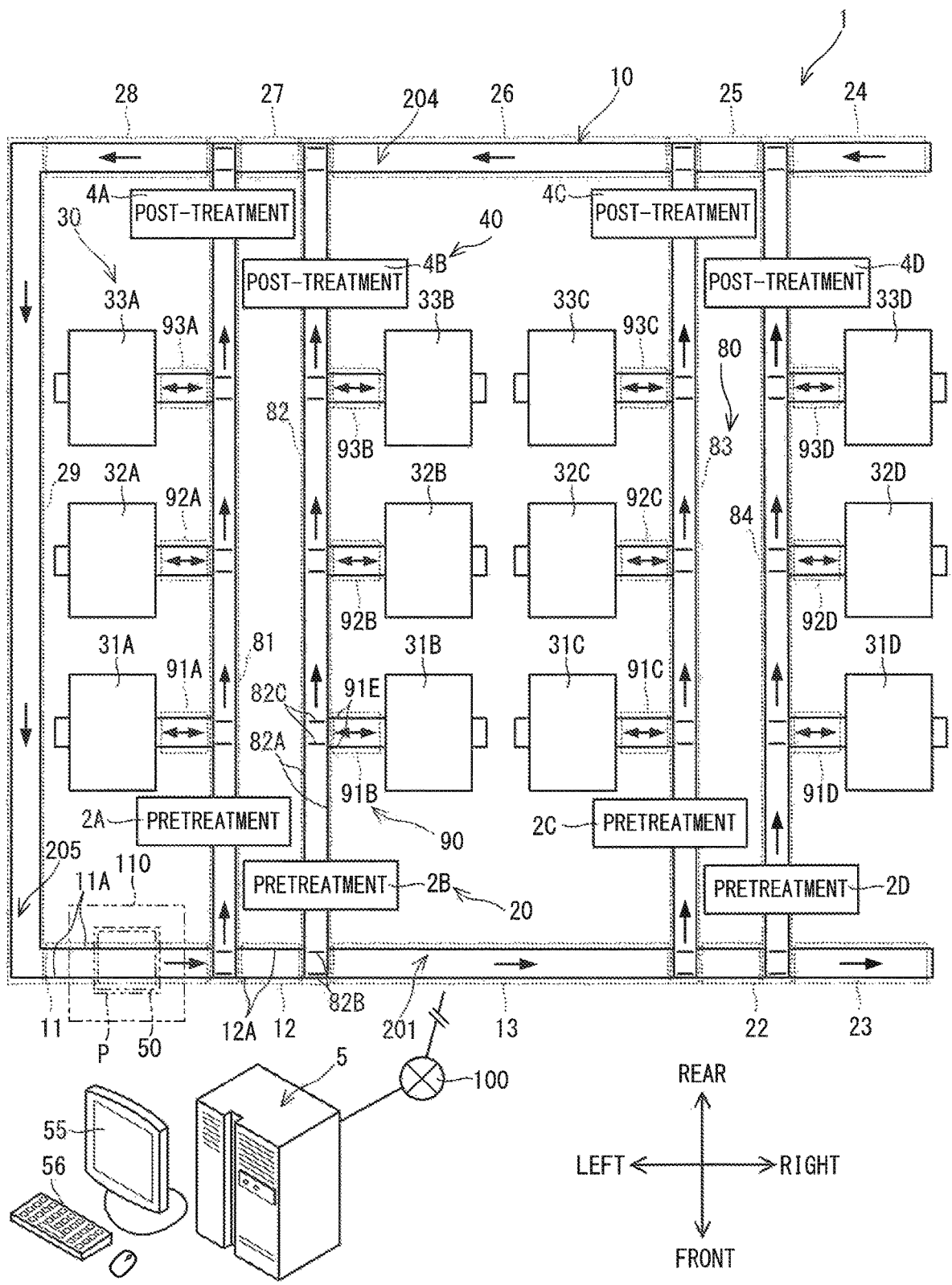
FIG. 1 is a diagram showing an overview of a conveyance control system 1.

Left and right and front and rear directions shown by arrows in the drawings are used in the following explanation. A conveyance control system 1 shown in FIG. 1 is a system that sequentially performs pretreatment, print processing, and post-treatment on a print medium held by a platen 50 as a holding portion while conveying the platen 50. An example of the print medium is a cloth P, such as a T-shirt. The material of the cloth P is cotton, polyester, a mixture of cotton and polyester, or the like.

Overview of Conveyance Control System 1

As shown in FIG. 1, the conveyance control system 1 is provided with a platen conveyance mechanism 10, pretreatment devices 2A, 2B, 2C, and 2D (hereinafter, when they are not distinguished from each other, collectively referred to as a "pretreatment device 20" or "pretreatment devices 20"), printers 31A, 32A, 33A, 31B, 32B, 33B, 31C, 32C, 33C, 31D, 32D, and 33D (hereinafter, when they are not distinguished from each other, collectively referred to as a "printer 30" or "printers 30"), post-treatment devices 4A, 4B, 4C, and 4D (hereinafter, when they are not distinguished from each other, collectively referred to as a "post-treatment device 40" or "post-treatment devices 40"), and a PC 5.

The platen conveyance mechanism 10 is provided with at least lanes 81, 82, 83, and 84 (hereinafter, when they are not distinguished from each other, collectively referred to as "lanes 80"), a shipment line 201, return lines 204 and 205, and conveyance mechanisms 91A, 92A, 93A, 91B, 92B, 93B, 91C, 92C, 93C, 91D, 92D, and 93D (hereinafter, when they are not distinguished from each other, collectively referred to as "conveyance mechanisms 90").

The shipment line 201 is positioned at the front of the conveyance control system 1 and extends in the left-right direction. The shipment line 201 conveys the platen 50 toward the lanes 81 to 84 to be described later. The shipment line 201 is provided with conveyance mechanisms 11, 12, 13, 22, and 23 in that order from the left side. Each of the conveyance mechanisms 11, 12, 13, 22, and 23 extends in the left-right direction. The conveyance mechanism 11 is provided with a preparation position 110. The preparation position 110 is a position at which the cloth P is set on the platen 50. The conveyance mechanisms 11, 12, 13, 22, and 23 each convey the platen 50 in the rightward direction. The return line 204 is positioned at the rear of the conveyance control system 1 and extends in the left-right direction. The return line 204 conveys the platen 50 received from each of the lanes 81 to 84. The return line 204 is provided with conveyance mechanisms 28, 27, 26, 25, and 24 in that order from the left side. Each of the conveyance mechanisms 28, 27, 26, 25, and 24 extends in the left-right direction and conveys the platen 50 in the leftward direction. The return line 205 is provided with a conveyance mechanism 29. The return line 205 conveys the platen 50 received from the return line 204 forward toward the left end of the shipment line 201.

The front end of the lane 81 is disposed between the conveyance mechanisms 11 and 12, and the rear end of the lane 81 is disposed between the conveyance mechanisms 27 and 28. The front end of the lane 82 is disposed between the conveyance mechanisms 12 and 13, and the rear end of the lane 82 is disposed between the conveyance mechanisms 26 and 27. The front end of the lane 83 is disposed between the conveyance mechanisms 13 and 22, and the rear end of the lane 83 is disposed between the conveyance mechanisms 25 and 26. The front end of the lane 84 is disposed between the conveyance mechanisms 22 and 23, and the rear end of the lane 84 is disposed between the conveyance mechanisms 24 and 25. Each of the lanes 81 to 84 extends in the front-rear direction and conveys the platen 50 in the rearward direction.

The printers 31A, 32A, and 33A are aligned in the front-rear direction to the left of the lane 81. The conveyance mechanisms 91A, 92A, and 93A that extend to the left from the lane 81 convey the platen 50 between the lane 81 and the printers 31A, 32A, and 33A. The printers 31B, 32B, and 33B are aligned in the front-rear direction to the right of the lane 82. The conveyance mechanisms 91B, 92B, and 93B that extend to the right from the lane 82 convey the platen 50 between the lane 82 and the printers 31B, 32B, and 33B. The printers 31C, 32C, and 33C are aligned in the front-rear direction to the left of the lane 83. The conveyance mechanisms 91C, 92C, and 93C that extend to the left from the lane 83 convey the platen 50 between the lane 83 and the printers 31C, 32C, and 33C. The printers 31D, 32D, and 33D are aligned in the front-rear direction to the right of the lane 84. The conveyance mechanisms 91D, 92D, and 93D that extend to the right from the lane 84 convey the platen 50 between the lane 84 and the printers 31D, 32D, and 33D. The printers 30 are inkjet printers that perform printing by ejecting ink from nozzles of a print head onto the cloth P after the pretreatment that is held by the platen 50.

The pretreatment device 2A is disposed to the front of the lane 81, and the pretreatment device 2B is disposed to the front of the lane 82. The pretreatment device 2C is disposed to the front of the lane 83, and the pretreatment device 2D is disposed to the front of the lane 84. In other words, the pretreatment devices 2A to 2D are disposed on an upstream side in a conveyance direction when the platen 50 is conveyed by the lanes 81 to 84 to the conveyance mechanisms 91A to 93D and the printers 31A to 33D. The pretreatment devices 20 perform the pretreatment on the cloth P before the printing is performed by the printers 30. Each of the pretreatment devices 20 is provided with an application portion and a heat processing portion that are not shown in the drawings. Each of the pretreatment devices 20 need not necessarily be provided with the heat processing portion. Using a spray or an inkjet print head, the application portion sprays a pretreatment agent and applies the pretreatment agent to the cloth P held by the platen 50. The pretreatment agent is a base coat agent that is applied before the ink is ejected onto the cloth P by the printers 30. The pretreatment agent is, for example, an aqueous solution that contains resin components and a metal salt, such as $CaCl2$. The heat processing portion dries the pretreatment agent by heating the cloth P at a high temperature, and thus, the heat processing portion enhances fixing of the pretreatment agent on the cloth P, and improves image quality.

The post-treatment device 4A is disposed to the rear of the lane 81, the post-treatment device 4B is disposed to the rear of the lane 82, and the post-treatment device 4C is disposed to the rear of the lane 83. The post-treatment device 4D is disposed to the rear of the lane 84. In other words, the post-treatment devices 4A to 4D are disposed on a downstream side in the conveyance direction when the platen 50 is conveyed by the lanes 81 to 84 to the conveyance mechanisms 91A to 93D and the printers 31A to 33D. The post-treatment devices 40 dry the ink by heating, at a high temperature, the cloth P onto which ink has been ejected by the printers 30, and thus fix the ink on the cloth P.

A belt configuration of the platen conveyance mechanism 10 will be explained. Since the configuration of the conveyance mechanisms 11 to 13, and 22 to 28 is the same, the belt configuration of the conveyance mechanisms 11 and 12 will be explained, and an explanation of the belt configuration of the conveyance mechanisms 13, and 22 to 28 will be omitted. Since the belt configuration of the lanes 80 is the same, the belt configuration of the lane 82 will be explained, and an explanation of the belt configuration of the lanes 81, 83, and 84 will be omitted. Since the belt configuration of the conveyance mechanisms 90 is the same, the belt configuration of the conveyance mechanism 91B will be explained, and an explanation of the belt configuration of the conveyance mechanisms 91A to 93A, 92B, 93B, 91C to 93C, and 91D to 93D will be omitted.

The conveyance mechanisms 11 and 12 are respectively provided with a pair of lateral belts 11A, and a pair of lateral belts 12A. The pairs of lateral belts 11A and 12A are provided at both end portions of the conveyance mechanisms 11 and 12 in a direction orthogonal to the conveyance direction, and convey the platen 50 in the rightward direction. The lane 82 is provided with a pair of longitudinal belts 82A, and pairs of lateral lifting belts 82B and 82C. The pair of longitudinal belts 82A are provided at both end portions of the lane 82 in a direction orthogonal to the conveyance direction. The pair of longitudinal belts 82A convey the platen 50 in the rearward direction. The pairs of lateral lifting belts 82B and 82C are disposed between the pair of longitudinal belts 82A. The pair of lateral lifting belts 82B are provided at the front end portion of the lane 82 such that they can be raised and lowered. The pair of lateral lifting belts 82B convey the platen 50 in the rightward direction. The pair of lateral lifting belts 82C are provided on the left side of the conveyance mechanism 91B such that they can be raised and lowered. The pair of lateral lifting belts 82C convey the platen 50 in the left-right direction. The conveyance mechanism 91B is provided with a pair of lateral belts 91E. The pair of lateral belts 91E move the platen 50 in the left-right direction. The raising and lowering of the pairs of lateral lifting belts 82B and 82C may be performed by a conveyance motor 10B to be described later or by an actuator that is driven by compressed air.

An example of a platen conveyance operation by the platen conveyance mechanism 10 will be explained. When the lateral belts 11A and 12A are driven, the platen 50 at the preparation position 110 is conveyed in the rightward direction. At this time, the lateral lifting belts 82B are disposed at the same height position as the lateral belts 12A. The platen 50 is transferred from the lateral belts 12A to the lateral lifting belts 82B. After that, the driving of the lateral lifting belts 82B is stopped, and the lateral lifting belts 82B are lowered. At the same time, the longitudinal belts 82A are driven. The lateral lifting belts 82B are lowered to be lower than the longitudinal belts 82A, and thus, the platen 50 is placed on the longitudinal belts 82A. The longitudinal belts 82A convey the platen 50 in the rearward direction. The platen 50 passes through the pretreatment device 2B and is conveyed further in the rearward direction.

When the platen 50 reaches a position above the lateral lifting belts 82C, the driving of the longitudinal belts 82A is stopped, and the raising of the lateral lifting belts 82C is started. The lateral lifting belts 82C are raised to be higher than the longitudinal belts 82A, and are stopped at the same height position as the lateral belts 91E. The lateral belts 91E and the longitudinal lifting belts 82C are driven, and the platen 50 is transferred from the lateral lifting belts 82C to the lateral belts 91E. The lateral belts 91E are driven, and the platen 50 is conveyed in the rightward direction toward the printer 31B. When the platen 50 reaches the printer 31B, a printing conveyance mechanism, to be described later, of the printer 31B receives the platen 50, and conveys the platen 50 to a printable position in the printer 31B. The printer 31B performs printing on the cloth P set on the platen 50 conveyed to the printable position.

After the printing by the printer 31B, the platen 50 is conveyed to the lateral belts 91E by the printing conveyance mechanism. The lateral belts 91E and the lateral lifting belts 82C are driven, and the platen 50 is conveyed in the leftward direction. The platen 50 is transferred from the lateral belts 91E to the lateral lifting belts 82C. When the platen 50 reaches a position above the lateral lifting belts 82C, the driving of the lateral belts 91E and the lateral lifting belts 82C is stopped. The lateral lifting belts 82C are lowered to be lower than the longitudinal belts 82A, and the platen 50 is transferred from the lateral lifting belts 82C to the longitudinal belts 82A. At the same time, the longitudinal belts 82A are driven. The platen 50 is conveyed in the rearward direction by the longitudinal belts 82A. The platen 50 passes through the post-treatment device 4B and is conveyed further in the rearward direction.

Although not described in detail, transfer operations are performed in the same manner as described above, and the platen 50 is conveyed to the conveyance mechanisms 27, 28, and 29 in that order, and returns to the preparation position 110.

The PC 5 is provided in the vicinity of the preparation position 110. The PC 5 is electrically connected to the platen conveyance mechanism 10, and controls the conveyance of the platen 50 by the platen conveyance mechanism 10. In accordance with the control by the PC 5, the platen conveyance mechanism 10 conveys the platen 50 from the preparation position 110 to the printers 30 via the shipment line 201 and the lanes 80. In accordance with the control by the PC 5, the platen conveyance mechanism 10 conveys the platen 50, which holds the cloth P printed by the printers 30, via the lanes 80 and the return lines 204 and 205, and once more returns the platen 50 to the preparation position 110.

The PC 5 is connected by a wired connection to the printers 30, the pretreatment devices 20, and the post-treatment devices 40, via a LAN 100. The PC 5 can communicate with the printers 30, the pretreatment devices 20, and the post-treatment devices 40 based on a TCP/IP protocol, and can transmit various commands to each of the devices via the LAN 100. On the basis of a pretreatment command from the PC 5, the pretreatment device 20 performs the pretreatment on the cloth P held by the platen 50 that is conveyed by the platen conveyance mechanism 10. On the basis of a print command received from the PC 5, the printer 30 performs the printing on the cloth P held by the platen 50 that is conveyed by the platen conveyance mechanism 10. On the basis of a post-treatment command received from the PC 5, the post-treatment device 40 performs the post-treatment on the cloth P held by the platen 50 that is conveyed by the platen conveyance mechanism 10.

Electrical Configuration of Conveyance Control System 1

Figure 2:
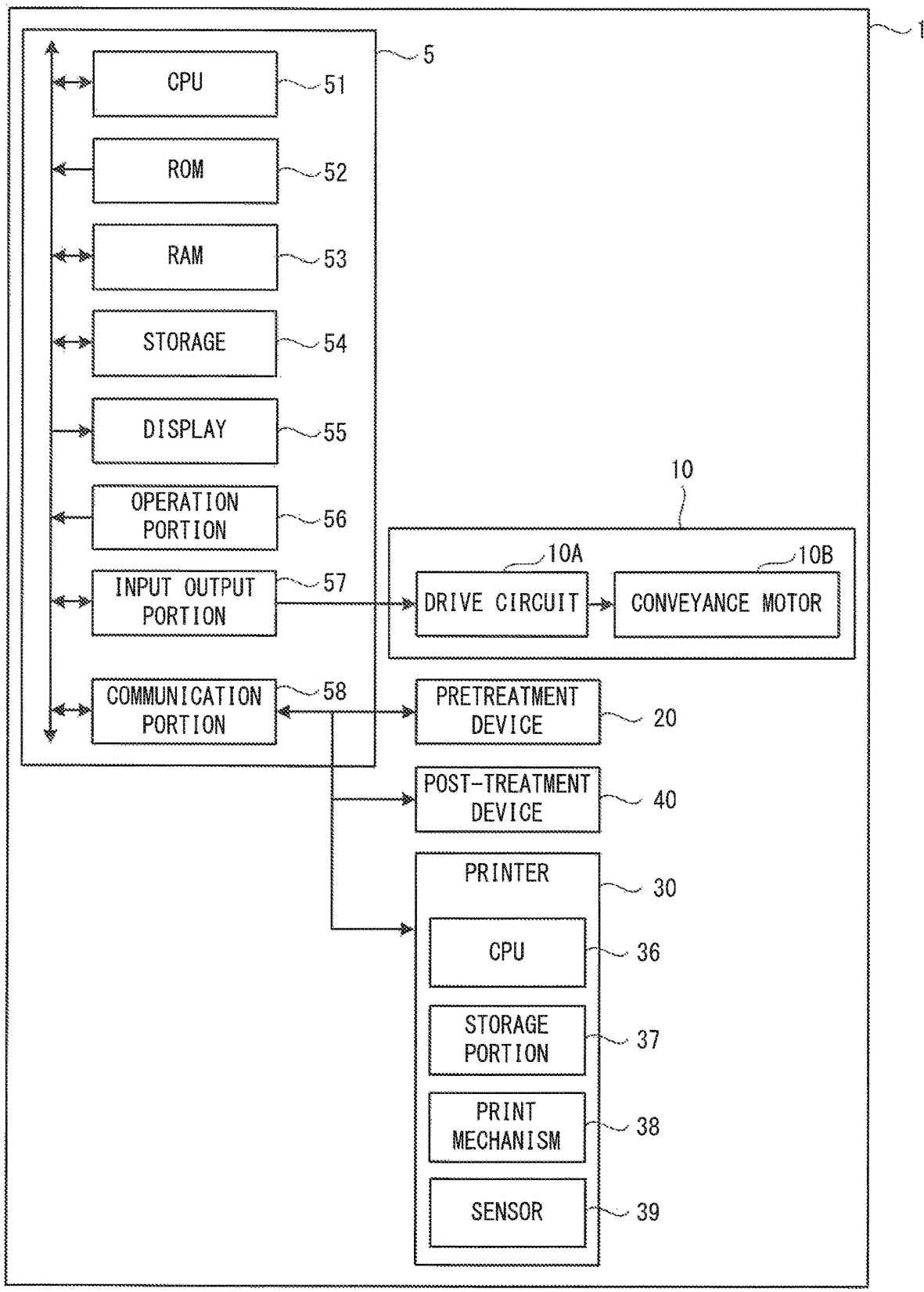
FIG. 2 is a block diagram showing an electrical configuration of the conveyance control system 1.

An electrical configuration of the conveyance control system 1 will be explained with reference to FIG. 2. The PC 5 is provided with a CPU 51, a ROM 52, a RAM 53, a storage 54, a display 55, an operation portion 56, an input/output portion 57, and a communication portion 58, which are each mutually connected via a bus.

The CPU 51 controls operation of the PC 5. The ROM 52 stores setting values and the like. The RAM 53 temporarily stores various types of information. The storage 54 is a non-volatile flash memory, and stores programs, a table 54A (refer to FIG. 3), and the like. The display 55 is an LCD that can display an image and the like. The operation portion 56 is a keyboard and a mouse. The input-output portion 57 is an interface circuit connected to the platen conveyance mechanism 10. The communication portion 58 is an interface circuit that performs communication on the basis of the TCP/IP protocol.

The platen conveyance mechanism 10 is provided with the conveyance motor 10B to convey the platen 50 along the lanes 80, the conveyance mechanisms 90, the shipment line 201, and the return lines 204 and 205, and with a drive circuit 10A to drive the conveyance motor 10B. The conveyance motor 10B may be configured by a plurality of motors. The drive circuit 10A is connected to the input/output portion 57 of the PC 5. The drive circuit 10A drives the conveyance motor 10B in accordance with a signal output from the input/output portion 57, and conveys the platen 50.

The pretreatment devices 20, the printers 30, and the post-treatment devices 40 are each connected to the communication portion 58 of the PC 5, and can perform communication with the PC 5 based on the TCP/IP protocol.

Each of the printers 30 is provided with a CPU 36, a storage portion 37, a print mechanism 38, and a sensor 39. The CPU 36 controls operation of the printer 30. The storage portion 37 is a non-volatile flash memory, and stores programs, printer identification information, print data, and the like.

Although not shown in the drawings, the print mechanism 38 includes the print head, the printing conveyance mechanism, and the like. The printing conveyance mechanism can convey the platen 50 in the left-right direction. Although not shown in the drawings, the printing conveyance mechanism is provided with a platen support member, a ball screw, a pair of rails, a motor, and the like. The platen support member receives the platen 50 from the conveyance mechanisms 90, and supports the platen 50. The ball screw extends in the left-right direction. The pair of rails are provided at positions at which the ball screw is at the center between the pair of rails (namely, are provided to the front and to the rear of the ball screw), and extend in the left-right direction. A nut that is screwed into the ball screw is fixed to the platen support member. When a motor rotates the ball screw, the platen support member can move together with the nut along the ball screw.

The sensor 39 can detect the platen 50 that is conveyed to the printers 30 via the conveyance mechanisms 90. A contact sensor or a proximity sensor can be used as the sensor 39. The contact sensor detects that the platen 50 transferred from the conveyance mechanism 90 comes into contact with a terminal, and outputs a detection signal to the CPU 36. The proximity sensor detects a magnetic field change or a capacitance that occurs when the platen 50 transferred from the conveyance mechanism 90 approaches the proximity sensor, and outputs a detection signal to the CPU 36.

Table 54A

The table 54A that is stored in the storage 54 of the PC 5 will be explained with reference to FIG. 3. An index, printer identification information, conveyance identification information, pretreatment device identification information, and post-treatment device identification information are associated with each other and stored in the table 54A. The printer identification information is identification information that can identify the printer 30 on the basis of the TCP/IP protocol. Specifically, the printer identification information is an IP address that is assigned to the printer 30. The conveyance identification information includes lane identification information and mechanism identification information. The lane identification information is identification information that can identify the lane 80. The mechanism identification information is identification information that can identify the conveyance mechanism 90. The pretreatment device identification information is identification information that can identify the pretreatment device 20 on the basis of the TCP/IP protocol. The post-treatment device identification information is identification information that can identify the post-treatment device 40 on the basis of the TCP/IP protocol. Specifically, the pretreatment device identification information is an IP address assigned to the pretreatment device 20, and the post-treatment device identification information is an IP address assigned to the post-treatment device 40.

The printer identification information, the conveyance identification information, the pretreatment device identification information, and the post-treatment device identification information that are associated with each other in the table 54A respectively correspond to the identification information of the lane 80, the conveyance mechanism 90, the pretreatment device 20 and the post treatment device 40, through which the platen 50 is conveyed when the printing is performed by the printer 30, and to the printer 30 in which the printing is to be performed.

For example, in FIG. 1, when the printing is performed by the printer 31A, the platen 50 passes through the lane 81, the pretreatment device 2A, the conveyance mechanism 91A, the printer 31A, and the post-treatment device 4A. Thus, as shown in FIG. 3, in a record for an index "1" of the table 54A, printer identification information "192.168.10.30" that identifies the printer 31A (refer to FIG. 1), lane identification information "81" that identifies the lane 81 (refer to FIG. 1), mechanism identification information "91A" that identifies the conveyance mechanism 91A (refer to FIG. 1), pretreatment device identification information "192.168.10.50" that identifies the pretreatment device 2A (refer to FIG. 1), and post-treatment device identification information "192.168.10.60" that identifies the post-treatment device 4A (refer to FIG. 1) are stored in association with each other.

In table 54A, the lane identification information, the mechanism identification information, the pretreatment device identification information, and the post-treatment device identification information are associated with each other and stored in advance, and the printer identification information is not stored in advance. The printer identification information is stored in the table 54A as a result of the CPU 51 (refer to FIG. 2) performing first registration processing (refer to FIG. 4) or second registration processing (refer to FIG. 5), to be described later.

First Registration Processing

Figure 4:
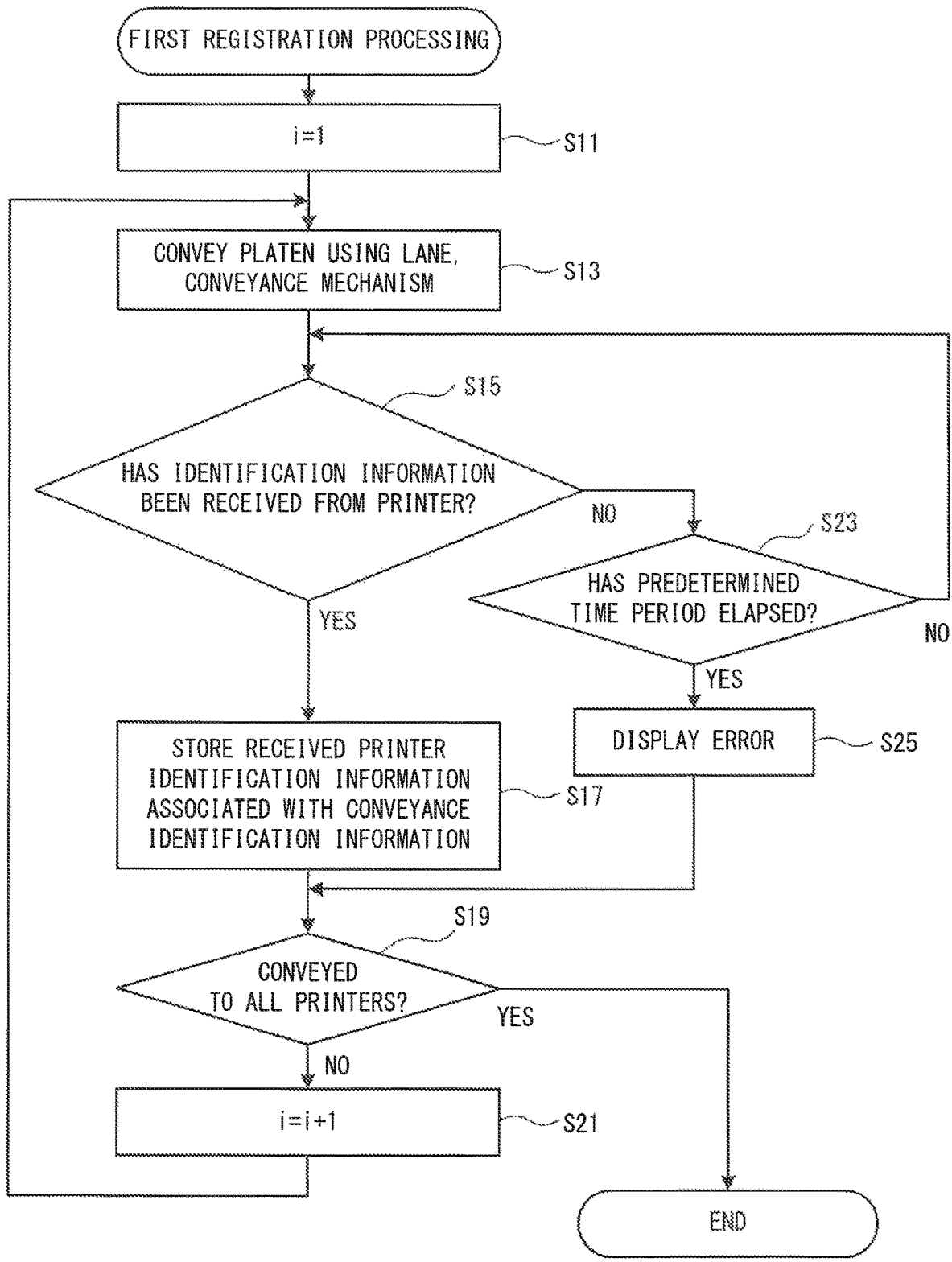
FIG. 4 is a flowchart of first registration processing.

The first registration processing that associates the conveyance identification information with the printer identification information will be explained with reference to FIG. 4. Before the start of the printing on the cloth P by the printer 30, the conveyance control system 1 starts the first registration processing by the CPU 51 reading out and executing a first registration processing program stored in the storage 54. For example, when a first execution command to execute the first registration processing is input via the operation portion 56, the CPU 51 starts the first registration processing.

The CPU 51 sets a variable i stored in the RAM 53 to 1 and performs initialization (step S11). The CPU 51 selects the conveyance identification information (the lane identification information and the mechanism identification information) included in the record for the index that is the same as the variable i in the table 54A (refer to FIG. 3). The CPU 51 drives the conveyance motor 10B by outputting a signal to the drive circuit 10A, and causes the platen 50 to be conveyed using the lane 80 identified by the selected lane identification information and the conveyance mechanism 90 identified by the mechanism identification information (step S13). The CPU 51 initializes and activates a timer. Using the timer, the CPU 51 can identify an elapsed time period from when the conveyance of the platen 50 is started.

The CPU 51 determines whether the printer identification information transmitted from the printer 30 has been received (step S15). When the CPU 51 determines that the printer identification information has not been received (no at step S15), on the basis of a value of the timer, the CPU 51 determines whether the elapsed time period from when the conveyance of the platen 50 is started by the processing at step S13 is equal to or more than a predetermined time period (step S23). When the CPU 51 determines that the elapsed time period is not equal to or more than the predetermined time period (no at step S23), the CPU 51 returns the processing to step S15.

When the CPU 51 determines that the printer identification information has been received (yes at step S15), the CPU 51 advances the processing to step S17. The CPU 51 stores the printer identification information received from the printer 30, in association with the conveyance identification information (the lane identification information and the mechanism identification information) included in the record for the index i of the table 54A (step S17).

The CPU 51 determines whether the platen 50 has been conveyed to all the printers 30 included in the conveyance control system 1 (step S19). When the variable i is smaller than a maximum value of the index of the table 54A, the CPU 51 determines that the platen 50 has not been conveyed to all the printers 30 included in the conveyance control system 1 (no at step S19). The CPU 51 adds 1 to the variable i and updates the variable i (step S21), and returns the processing to step S13. The CPU 51 repeats the above-described processing on the basis of the updated variable i. When the maximum value of the index of the table 54A and the variable i match each other, the CPU 51 determines that the platen 50 has been conveyed to all the printers 30 included in the conveyance control system 1 (yes at step S19). At this time, the CPU 51 ends the first registration processing.

After the conveyance of the platen 50 is started (step S13), when it is determined that the printer identification information has not been received from the printer 30 (no at step S15) and the elapsed time period is equal to or more than the predetermined time period (yes at step S23), the CPU 51 advances the processing to step S25. For example, when the lane 84 and the conveyance mechanism 93D (refer to FIG. 1) are selected and the platen 50 is conveyed, if the printer 33D is unable to transmit the printer identification information, since the printer identification information from the printer 33D is not received, the elapsed time period becomes equal to or more than the predetermined time period (yes at step S23). A time at which the printer 33D is unable to transmit the printer identification information is conceivably when the printer 33D is not provided in the conveyance mechanism 93D, when a power source of the printer 33D is turned off, or the like. When the elapsed time period is equal to or more than the predetermined time period (yes at step S23), the CPU 51 does not store the printer identification information in association with the conveyance identification information included in the record for the index i of the table 54A. The CPU 51 acquires the conveyance identification information (the lane identification information and the mechanism identification information) included in the record for the index i of the table 54A. The CPU 51 displays, on the display 55, the lane 80 identified by the acquired lane identification information and the conveyance mechanism 90 identified by the acquired mechanism identification information (step S25). The CPU 51 displays, on the display 55, an error message notifying that there is a possibility that the printer 30 is not provided in the displayed conveyance mechanism 90 or that the power supply of the printer 30 is turned off (step S25). The CPU 51 advances the processing to step S19.

Second Registration Processing

The processing to associate the conveyance identification information and the printer identification information with each other is not limited to the first registration processing. The second registration processing will be explained with reference to FIG. 5. Before the start of the printing on the cloth P by the printer 30, the conveyance control system 1 starts the second registration processing by the CPU 51 reading out and executing a second registration processing program stored in the storage 54. For example, when a second execution command to execute the second registration processing is input via the operation portion 56, the CPU 51 starts the second first registration processing.

Figure 6:
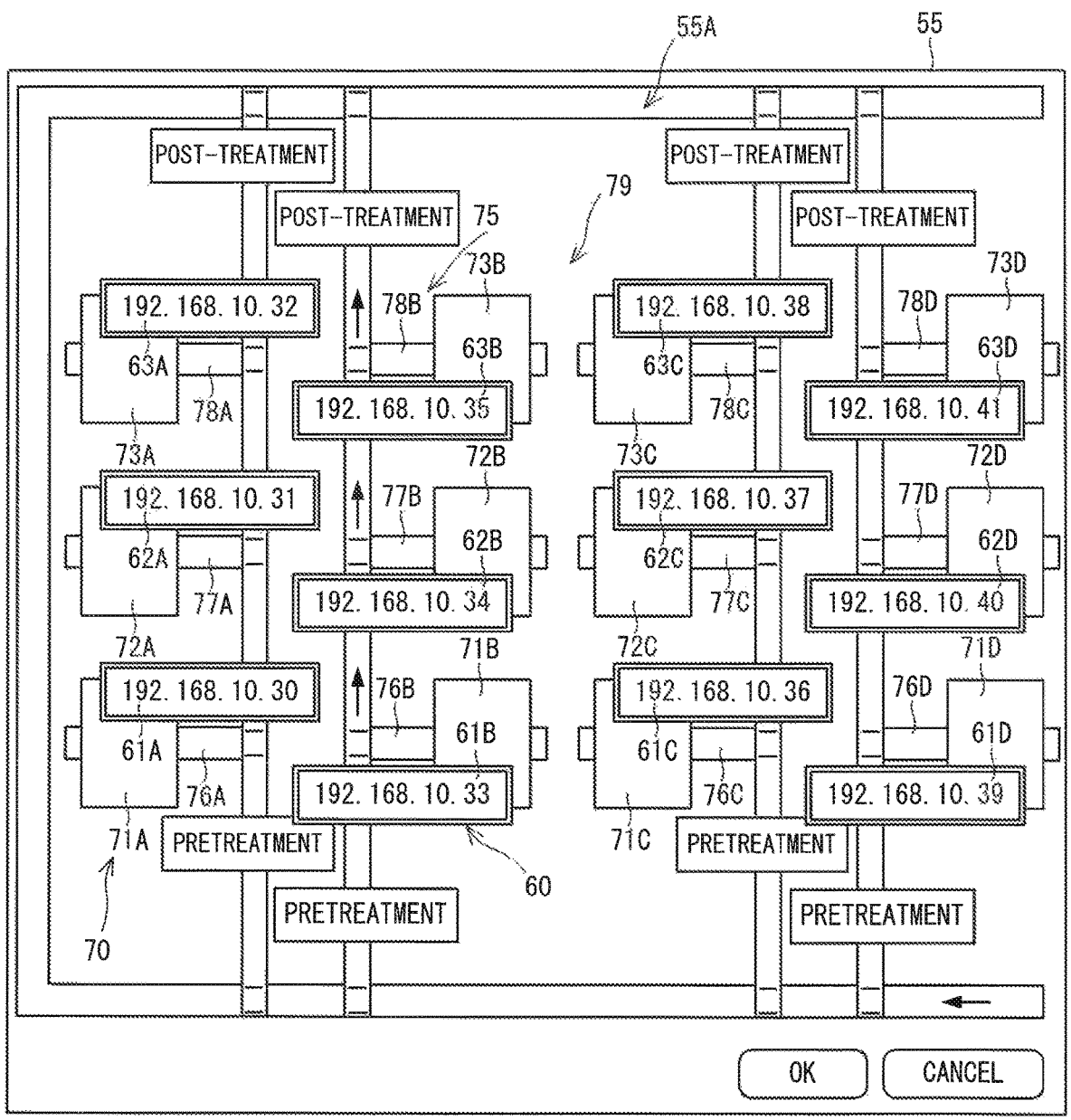
FIG. 6 is a diagram showing an input screen 55A.

The CPU 51 displays an input screen 55A (refer to FIG. 6) on the display 55 (step S31). FIG. 6 shows an example of the input screen 55A displayed on the display 55. The input screen 55 includes a related image 79, input areas 60, an OK button, and a cancel button.

The CPU 51 displays, on the input screen 55A, printer images 71A, 72A, 73A, 71B, 72B, 73B, 71C, 72C, 73C, 71D, 72D, and 73D that respectively indicate the printers 31A, 32A, 33A, 31B, 32B, 33B, 31C, 32C, 33C, 31D, 32D, and 33D (refer to FIG. 1). Hereinafter, when the printer images 71A to 73D are not distinguished from each other, they are collectively referred to as a "printer image 70" or "printer images 70." Further, the CPU 51 displays, on the input screen 55A, conveyance images 76A, 77A, 78A, 76B, 77B, 78B, 76C, 77C, 78C, 76D, 77D, and 78D, that respectively indicate the conveyance mechanisms 91A, 92A, 93A, 91B, 92B, 93B, 91C, 92C, 91D, 92D, and 93D (refer to FIG. 1). Hereinafter, when the conveyance images 76A to 78D are not distinguished from each other, they are collectively referred to as a "conveyance image 75" or "conveyance images 75."

The CPU 51 displays the printer images 70 and the conveyance images 75 in association with each other, such as displaying them coupled together or the like. An image displayed in which the printer images 70 and the conveyance images 75 are associated with each other is defined as the related image 79.

The CPU 51 further displays, on the input screen 55A, input areas 61A, 62A, 63A, 61B, 62B, 63B, 61C, 62C, 63C, 61D, 62D, and 63D that are used to input the printer identification information. Hereinafter, when the input areas 61A to 63D are not distinguished from each other, they are collectively referred to as an "input image 60" or "input images 60."

The CPU 51 arranges the input area 60 such that a distance between the input area 60 and the corresponding printer image 70 is a shortest distance, compared to distances between the input area 60 and the printer images 70 that do not correspond thereto. The position in which the input area 60 is arranged is a first position. The position of the input area 60 partially overlaps with the corresponding printer image 70, for example.

The printer identification information of the printer 30 indicated by the printer image 70 corresponding to the input area 60 can be input into the input area 60.

The OK button is selected by a user when an input operation of the printer identification information with respect to the input area 60 is made valid. The cancel button is selected by the user when the printer identification information input to the input area 60 is made invalid.

Figure 5:
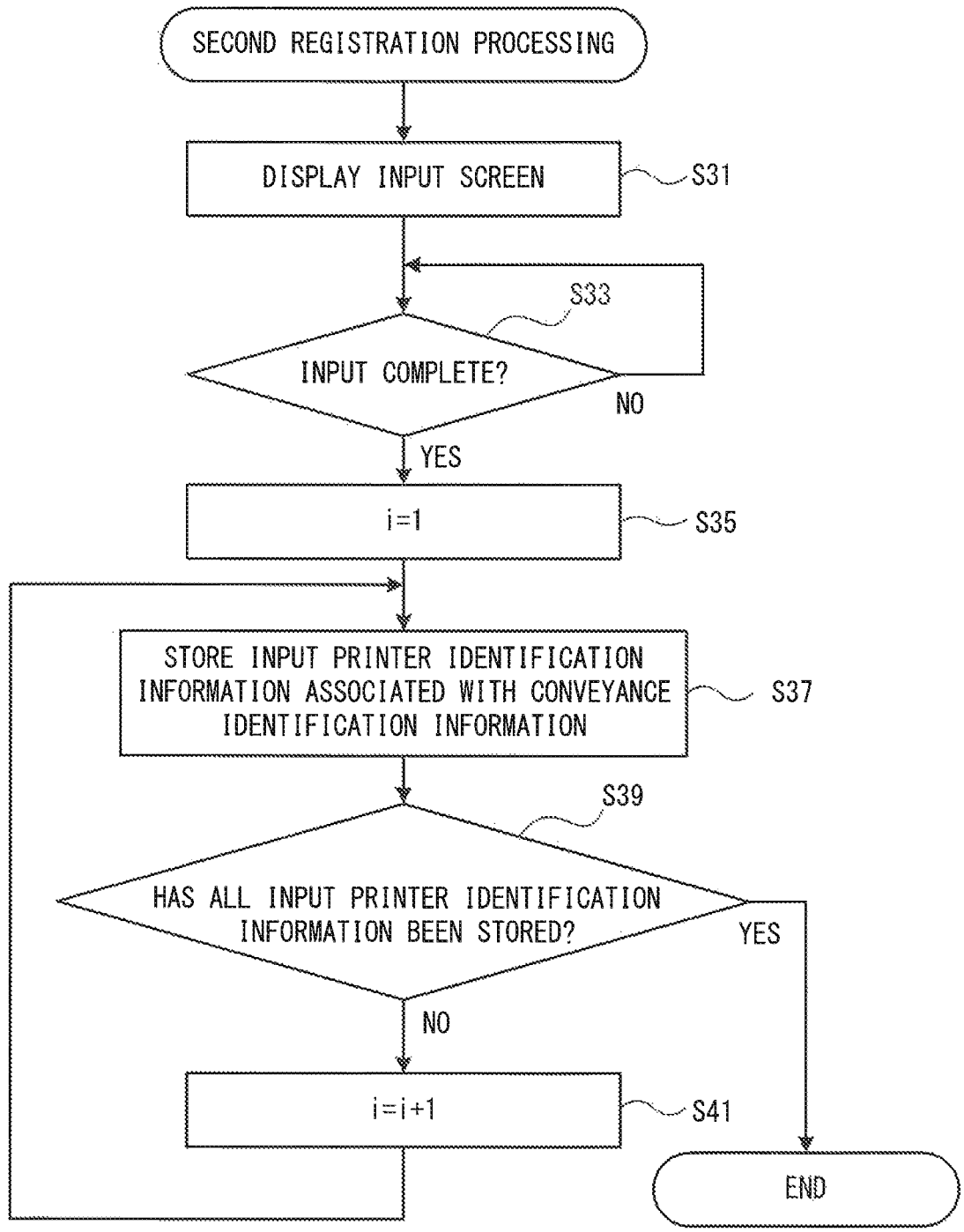
FIG. 5 is a flowchart of second registration processing.

After the processing at step S31 shown in FIG. 5, the CPU 51 receives an operation to input the printer identification information to the input area 60 via the operation portion 56. When the printer identification information is input using the operation portion 56, the CPU 51 stores the input printer identification information in the RAM 53. Further, the CPU 51 identifies the conveyance image 75 associated with the printer image 70 for which the distance between the printer image 70 and the input area 60 to which the printer identification information has been input is shortest, associates the mechanism identification information that identifies the conveyance mechanism 90 indicated by the identified conveyance image 75 with the input printer identification information, and stores the associated information in the RAM 53. When the operation to select the OK button is detected (yes at step S33), the CPU 51 advances the processing to step S35.

The CPU 51 sets the variable i stored in the RAM 53 to 1 and performs the initialization (step S35). Referring to the table 54A, the CPU 51 extracts the mechanism identification information included in the record for the index that is the same as the variable i. The CPU 51 selects, from the printer identification information stored in the RAM 53, the printer identification information associated with the extracted mechanism identification information. The CPU 51 stores the selected printer identification information in the table 54A as the printer identification information of the record for the index that is the same as the variable i (step S37). Thus, the input printer identification information and the conveyance identification information are associated with each other in the table 54A. When the printer identification information associated with the mechanism identification information included in the record for the index that is the same as the variable i is not stored in the RAM 53, the CPU 51 stores nothing in the table 54A as the printer identification information of the record for the index that is the same as the variable i.

The CPU 51 determines whether all the printer identification information input to the input areas 60 is stored in the table 54A (step S39). When the variable i is smaller than the maximum value of the index of the table 54A, the CPU 51 determines that all the printer identification information input to the input areas 60 is not stored in the table 54A (no at step S39). The CPU 51 adds 1 to the variable i and updates the variable i (step S41), and returns the processing to step S37. The CPU 51 repeats the processing on the basis of the updated variable i. When the maximum value of the index of the table 54A matches the variable i, the CPU 51 determines that all the printer identification information input to the input areas 60 is stored in the table 54A (yest at step S39). At this time, the CPU 51 ends the second registration processing.

Confirmation Processing

Figure 7:
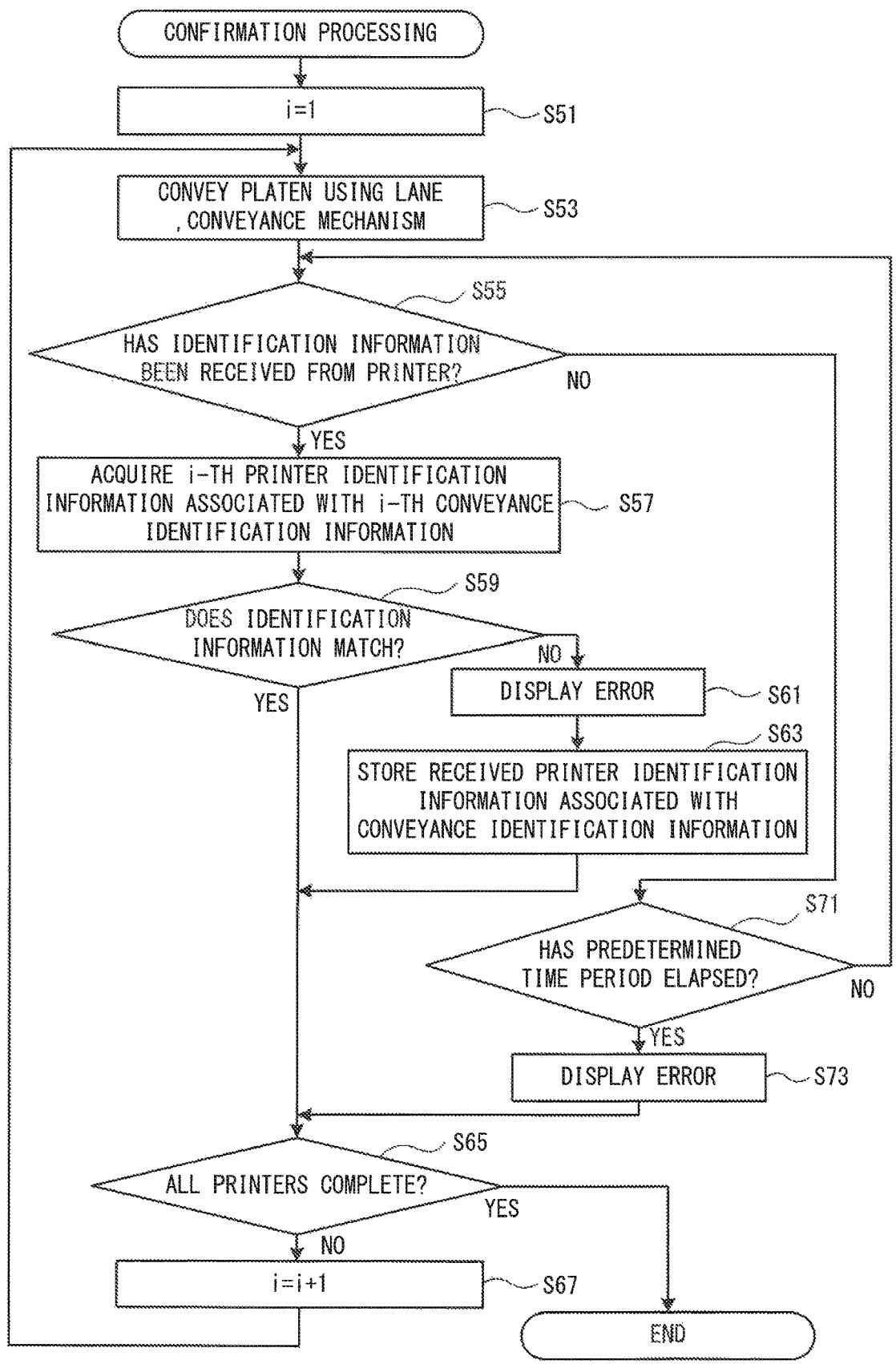
FIG. 7 is a flowchart of confirmation processing.

Confirmation processing will be explained with reference to FIG. 7. After the printer identification information is stored in the table 54A by the first registration processing (refer to FIG. 4) or the second registration processing (refer to FIG. 5), the confirmation processing is started by the CPU 51 reading out and executing a confirmation processing program stored in the storage 54. For example, when a confirmation execution command to execute the confirmation processing is input via the operation portion 56, the CPU 51 starts the confirmation processing.

The CPU 51 sets the variable i stored in the RAM 53 to 1 and performs the initialization (step S51). The CPU 51 selects the conveyance identification information (the lane identification information and the mechanism identification information) included in the record for the index that is the same as the variable i in the table 54A (refer to FIG. 3). The CPU 51 drives the conveyance motor 10B by outputting a signal to the drive circuit 10A, and causes the platen 50 to be conveyed using the lane 80 identified by the selected lane identification information and the conveyance mechanism 90 identified by the mechanism identification information (step S53).

The CPU 51 determines whether the printer identification information transmitted from the printer 30 has been received (step S55). When the CPU 51 has not received the printer identification information (no at step S55), the CPU 51 determines whether the elapsed time period from when the conveyance of the platen 50 is started by the processing at step S53 is equal to or more than the predetermined time period (step S71). When the CPU 51 determines that the elapsed time period is not equal to or more than the predetermined time period (no at step S71), the CPU 51 returns the processing to step S55. When the CPU 51 determines that the printer identification information has been received (yes at step S55), the CPU 51 advances the processing to step S57.

The CPU 51 acquires the printer identification information included in the record for the index i of the table 54A (step S57). The CPU 51 compares the acquired printer identification information with the printer identification information received from the printer 30 (step S59). When the CPU 51 determines that the two pieces of printer identification information match each other (yes at step S59), the CPU 51 advances the processing to step S65.

When the CPU 51 determines that the two pieces of printer identification information are different from each other (no at step S59), the CPU 51 advances the processing to step S61. For example, when the new lane 80 is added to the conveyance control system 1, since the printer identification information is not stored in the table 54A, the CPU 51 determines that the printer identification information is different. Further, when the arrangement of the printer 30 that was once installed is changed, or when the printer identification information different from the printer identification information assigned to the printer 30 is mistakenly input to the input area 60 and stored in the table 54A by the second registration processing, the CPU 51 determines that the printer identification information is different. At this time, the CPU 51 displays, on the display 55, an error message notifying that the printer identification information stored in the table 54A and the printer identification information received from the printer 30 are different from each other (step S61). The CPU 51 associates the printer identification information received from the printer 30 with the lane identification information and the mechanism identification information corresponding to the index i of the table 54A, and stores the associated information (step S63). The CPU 51 advances the processing to step S65.

The CPU 51 determines whether the platen 50 has been conveyed to all the printers 30 included in the conveyance control system 1 (step S65). When the variable i is smaller than the maximum value of the index of the table 54A, the CPU 51 determines that the platen 50 has not been conveyed to all the printers 30 included in the conveyance control system 1 (no at step S65). The CPU 51 adds 1 to the variable i and updates the variable i (step S67), and returns the processing to step S53. The CPU 51 repeats the above-described processing in the confirmation processing on the basis of the updated variable i. When the maximum value of the index matches the variable i, the CPU 51 determines that the platen 50 has been conveyed to all the printers 30 included in the conveyance control system 1 (yes at step S65). At this time, the CPU 51 ends the confirmation processing.

From when the conveyance of the platen 50 is started (step S53), when the CPU 51 determines that the elapsed time period is equal to or more than the predetermined time period (yes at step S71), the CPU 51 advances the processing to step S73. The CPU 51 does not store the printer identification information in association with the conveyance identification information included in the record for the index i of the table 54A. The CPU 51 displays, on the display 55, the lane 80 identified by the lane identification information included in the record for the index I of the table 54A, and the conveyance mechanism 90 identified by the acquired mechanism identification information. The CPU 51 displays, on the display 55, the error message notifying that there is a possibility that the printer 30 is not provided in the displayed conveyance mechanism 90 or that the power supply of the printer 30 is turned off (step S73). At this time, it is preferable that the CPU 51 prohibit the printing using the printer 30 identified by the printer identification information, by deleting the printer identification information included in the record for the index i of the table 54A or the like. The CPU 51 advances the processing to step S65.

Conveyance Processing

Figure 8:
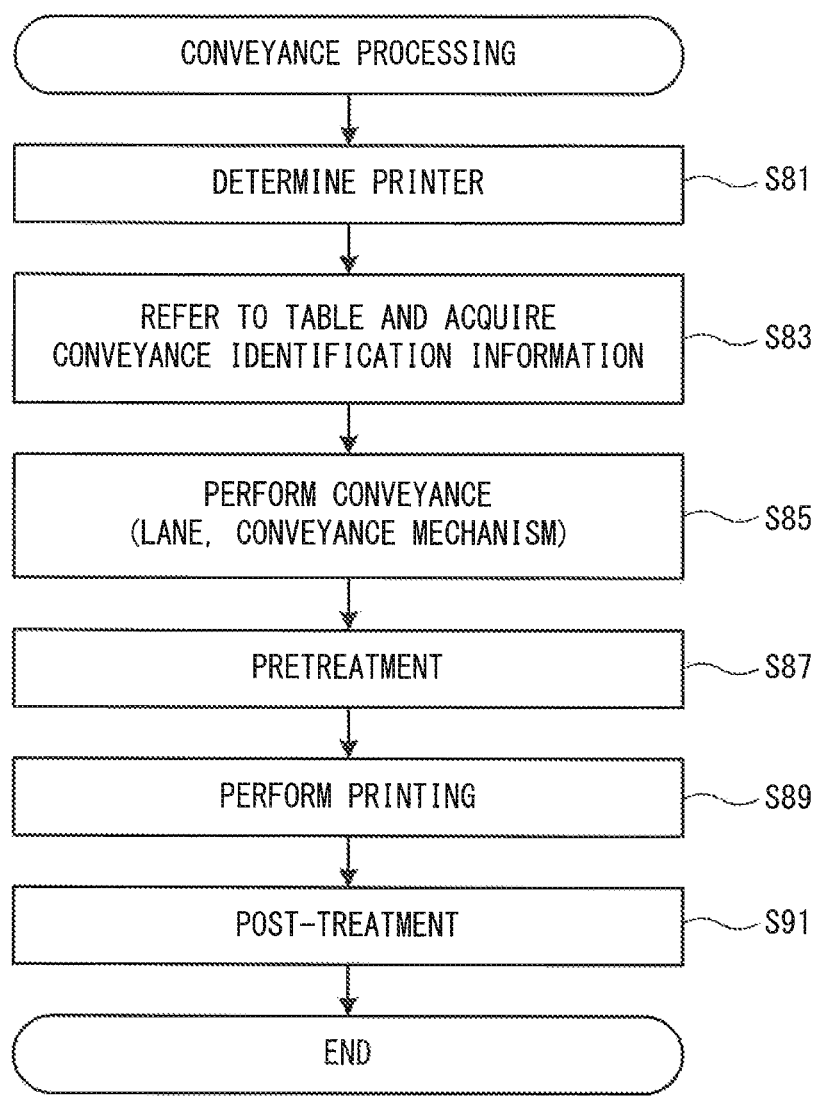
FIG. 8 is a flowchart of conveyance processing.

Conveyance processing will be explained with reference to FIG. 8. When the conveyance control system 1 starts the printing on the cloth P by the printer 30, the conveyance processing is started by the CPU 51 reading out and executing a conveyance processing program stored in the storage 54. For example, when a print execution command to execute the print processing is input via the operation portion 56, the CPU 51 starts the conveyance processing.

The CPU 51 determines, as the printer 30 to be used to execute the print processing, the printer 30 specified when the print execution command is input via the operation portion 56 (step S81). Referring to the table 54A, the CPU 51 acquires the conveyance identification information (the lane identification information and the mechanism identification information) corresponding to the printer identification information of the determined printer 30 (step S83). The CPU 51 drives the conveyance motor 10B by outputting a signal to the drive circuit 10A, and causes the platen 50 to be conveyed using the lane 80 identified by the acquired lane identification information and the conveyance mechanism 90 identified by the acquired mechanism identification information (step S85).

Referring to the table 54A, the CPU 51 acquires the pretreatment device identification information associated with the printer identification information of the printer 30 determined by the processing at step S81. The CPU 51 transmits, to the pretreatment device 20 identified by the acquired pretreatment device identification information, the pretreatment command to execute the pretreatment. Thus, the CPU 51 causes the pretreatment device 20 to perform the pretreatment on the cloth P held by the platen 50 that is conveyed using the lane 80 (step S87).

The CPU 51 transmits, to the printer 30 determined by the processing at step S81 as an address of the printer identification information of the determined printer 30, the print command to execute print processing. Thus, the CPU 51 causes the printer 30 to perform the print processing on the cloth P held by the platen 50 that is conveyed by the conveyance mechanism 90 (step S89).

Referring to the table 54A, the CPU 51 acquires the post-treatment device identification information associated with the printer identification information of the printer 30 determined by the processing at step S81. The CPU 51 transmits, to the post-treatment device 40 identified by the acquired post-treatment device identification information, the post-treatment command to execute the post-treatment. Thus, the CPU 51 causes the post-treatment device 40 to perform the post-treatment on the cloth P held by the platen 50 that is conveyed using the lane 80 (step S91). The CPU 51 ends the conveyance processing.

Print Processing

The print processing will be explained with reference to FIG. 9. When the power supply of the printer 30 is turned on, the print processing is started by the CPU 36 reading out and executing a print processing program stored in the storage portion 37 of the printer 30.

The CPU 36 determines whether the platen 50 that is conveyed by the conveyance mechanism 90 has been detected by the sensor 39 (step S101). When the CPU 36 determines that the sensor 39 has not detected the platen 50 (no at step S101), the CPU 36 returns the processing to step S101. When the CPU 36 determines that the sensor 39 has detected the platen 50 (yes at step S101), the CPU 36 reads out the printer identification information stored in the storage portion 37. The CPU 36 transmits the read printer identification information to the CPU 51 (step S103).

The CPU 36 determines whether the first registration processing (refer to FIG. 4) or the confirmation processing (refer to FIG. 7) is being performed by the CPU 51 (Step S105). For example, when the CPU 36 has not received the print command transmitted from the CPU 51, the CPU 36 determines that the CPU 51 is performing the first registration processing or the confirmation processing (yes at step S105). At this time, it is not necessary to perform the printing on the cloth P held by the platen 50 that is conveyed, and thus the CPU 36 advances the processing to step S109.

Meanwhile, for example, when the CPU 36 receives the print command transmitted from the CPU 51, the CPU 36 determines that the CPU 51 is not performing the first registration processing or the confirmation processing (no at step S105). At this time, the conveyance processing (refer to FIG. 8) is being performed by the CPU 51, and the CPU 36 controls the print mechanism 38 on the basis of the print data stored in the storage portion 37, and performs the print processing on the cloth P held by the platen 50 that is conveyed (step S107). The CPU 36 advances the processing to step S109.

The CPU 36 determines whether an end command to end the print processing has been input via an input portion (not shown in the drawings) (step S109). When the CPU 51 36 determines that the end command has not been input (no at step S109), the CPU 36 returns the processing to step S101. When the CPU 36 determines that the end command has been input (yes at step S109), the CPU 36 ends the print processing.

Operations and Effects of Present Embodiment

In the conveyance control system 1, the storage 54 stores the printer identification information and the conveyance identification information in association with each other. Thus, when the printer 30 performs the printing, the CPU 51 of the PC 5 acquires, from the storage 54, the conveyance identification information associated with the printer identification information (step S83). On the basis of the acquired conveyance identification information (the lane identification information and the mechanism identification information), the CPU 51 transports the platen 50 to the printer 30 using the corresponding lane 80 and conveyance mechanism 90. Thus, by conveying the platen 50 using the lane 80 and the conveyance mechanism 90, the CPU 51 can convey the cloth P to the printer 30 to be used for the printing.

When the platen 50 is detected by the sensor 39, the printer 30 transmits the printer identification information to the CPU 51 (step S103). By receiving the printer identification information transmitted from the printer 30 (step S15), the CPU 51 can recognize it as the printer identification information of the printer 30 installed on the lane 80 and the conveyance mechanism 90 to which the platen 50 has been conveyed. Further, the CPU 51 can associate the conveyance identification information to identify the lane 80 and the conveyance mechanism 90 to which the platen 50 has been conveyed with the recognized printer identification information, and store the associated information in the table 54A. Thus, when the print processing is performed next time using the same printer 30, the CPU 51 can convey the platen 50 using the lane 80 and the conveyance mechanism 90.

In the confirmation processing (refer to FIG. 7), the CPU 51 compares the printer identification information that is associated with the conveyance identification information and stored in the table 54A, with the printer identification information received from the printer 30 (step S59). Thus, the CPU 51 can determine whether or not the printer identification information of the printer 30 that is actually installed on the conveyance mechanism 90 to which the platen 50 has been conveyed matches the printer identification information stored in the table 54A, when the two pieces of printer identification information are compared.

After the conveyance of the platen 50 is started (step S13), when the printer identification information is not received even after the predetermined time period has elapsed (yes at step S23), the CPU 51 displays the error message on the display 55 (step S25), and does not store the conveyance identification information and the printer identification information in association with each other in the table 54A. Thus, the CPU 51 can reduce a possibility that the relationship between the printer identification information and the conveyance identification information associated with each other and stored in the table 54A differs from the relationship between the printer 30 actually provided in the conveyance mechanism 90 and the conveyance mechanism 90.

The CPU 51 displays the input screen 55A on the display 55, and displays the related image 79 and the input areas 60 on the display 55. The CPU 51 associates the printer identification information input via the operation portion 56 with the conveyance identification information and stores the associated information in the table 54A. Thus, the CPU 51 can register the printer identification information and the conveyance identification information in the table 54A in association with each other.

On the input screen 55A, the CPU 51 displays the input area 60, to which the printer identification information of the printer 30 corresponding to a first printer image 70 can be input, in the first position, which is the position at which a distance between the input area 60 and the first printer image 70 is shorter than a distance between the input area 60 and a second printer image 70. Thus, the CPU 51 can perform the display such that the user can easily distinguish between the input area 60 to which the user inputs the printer identification information of the printer 30 and the other input areas 60 to which the user inputs the printer identification information of the other printers 30. As a result, the user can easily ascertain the input are 60 to which the printer identification information is input, in accordance with the positional relationship of the printer images 70 and the input areas 60 displayed on the display 55.

The pretreatment device identification information and the post-treatment device identification information are associated with the printer identification information, and are stored in the table 54A. Thus, the CPU 51 conveys the platen 50 to the pretreatment device 20 before conveying the platen 50 toward the printer 30, and causes the pretreatment device 20 to perform the pretreatment. Further, the CPU 51 causes the post-treatment device 40 to perform the post-treatment after the printing by the printer 30.

Modified Examples

The present disclosure is not limited to the above-described embodiment, and various modifications are possible. The printer identification information that identifies the printer 30 is not limited to the IP address. For example, an ID, a host name, and the like of the printer 30 may be used as the printer identification information. The connection medium to connect the printers 30 and the PC 5 is not limited to the LAN 100, and a public network, and a wireless network (a wireless LAN, Bluetooth, and the like) may be used. The printer 30 that performs printing using another printing method (a thermal sensitive type, a laser printer, laser marking, and the like) may be used as the printer 30. The print medium is not limited to the cloth P. A processing device that can perform processing on the target object may be used in place of the printer 30. Examples of the processing device include a sewing machine, a machine tool, and the like. An object other than the cloth P may be used as the target object. For example, when a machine tool is used as the processing device, a work material may be used as the target object, and a table may be used as a holding portion to hold the work material in the same manner as the platen 50. When a sewing machine is used as the processing device, an embroidery frame may be used as a holding portion to hold a cloth in the same manner as the platen 50. The holding portion is not limited to the platen 50, the table, or the embroidery frame, but may be anything that can hold the target object and can be conveyed by a conveyance mechanism. When the machine tool, the sewing machine, or the like is provided as the processing device, an IP address of a communication device provided in the machine tool, the sewing machine, or the like may be used as processing device identification information.

The printer identification information of the printer 30 may be stored in the storage portion 37 using the following methods, for example. The printer identification information may be stored in the storage portion 37 when the printer identification information is input via an operation portion (not shown in the drawings) of the printer 30. Further, the PC 5 may have a DHCP server function. At this time, the printer identification information may be automatically assigned to the printers 30 connected to the LAN 100 by the DHCP server function of the PC 5. The printer 30 may acquire the printer identification information assigned to itself from the PC 5, and may store the acquired printer identification information in the storage portion 37.

The PC 5 may be a dedicated server integrated into the platen conveyance mechanism 10. The printer 30 that performs the print processing at step S81 may be selected as a result of the CPU 51 of the PC 5 automatically selecting the printer 30 that can perform the print processing, and determining the selected printer 30 to be the printer 30 that performs the print processing, for example. The CPU 51 may determine the printer 30 to perform the print processing in accordance with printer features (for example, a type of the ink that can be ejected, a printing speed, and a resolution) and print content (for example, the print data, and the type of the cloth P). The printer features may be received from the printer 30 together with the printer identification information and stored in the table 54 in association with the printer identification information. The print data for the printer 30 to perform the printing may be transmitted to the printer 30 at the same time that the print command is transmitted from the CPU 51 to the printer 30, or may be included in print command data and transmitted to the printer 30 via the LAN 100. The printer 30 may receive and store the print data in the storage portion 37.

When the printer 30 detects the platen 50 using the sensor 39, the printer 30 may transmit, to the CPU 51, an IP packet having a data portion in which a command indicating that the platen 50 has been detected is included. At this time, the IP address (the printer identification information) of the transmission source is stored in a header portion of the IP packet. Thus, the printer 30 need not necessarily include the printer identification information in the data portion of the IP packet. When the CPU 51 receives the command, the CPU 51 may acquire, as the printer identification information of the printer 30, the IP address of the transmission source stored in the header portion of the IP packet. The CPU 51 may associate the acquired printer identification information with the conveyance identification information and store the associated information in the table 54A.

In the confirmation processing (refer to FIG. 7), the CPU 51 may store the printer identification information received from the printer 30 in the table 54A, in association with the lane 80 used to convey the platen 50 and the conveyance identification information of the conveyance mechanism 90, regardless of whether or not the printer identification information stored in the table 54A matches the printer identification information received from the printer 30. At this time, the CPU 51 need not necessarily perform the determination processing at step S59. At step S31, on the input screen 55A, the CPU 51 may display the input areas in association with the pretreatment devices 20 and the post-treatment devices 40. The user may input the pretreatment device identification information of the pretreatment devices 20 and the post-treatment device identification information of the post-treatment devices 40 to the input areas. The CPU 51 may store the input pretreatment device identification information and post-treatment device identification information in the table 54A.

On the input screen 55A, the printer image 70 and the input area 60 corresponding to the printer image 70 and to which the printer identification information of the printer 30 is input may be separated from each other. At this time, for example, the printer image 70 and the input area 60 that correspond to each other may be connected using an arrow or the like.

The pretreatment device 20 and the post-treatment device 40 may include a sensor, similar to the sensor 39. Using the same processing as the first registration processing or the second registration processing, the CPU 51 may register the pretreatment device identification information of the pretreatment device 20 and the post-treatment device identification information of the post-treatment device 40. The sensor 39 may be provided independently from the printer 30. For example, when the platen 50 is detected by the sensor 39, the sensor 39 may communicates with the printer 30, and the CPU 36 of the printer 30 may transmit the IP address of the printer 30 to the CPU 51. In the pretreatment device 20 and the post-treatment device 40 also, the sensor may be provided independently from the pretreatment device 20 and the post-treatment device 40.

The PC 5 need not necessarily have the built-in storage 54 in which the table 54A is stored. For example, the table 54A may be stored in an external memory (a USB memory or an external SSD) that can be connected to the PC 5. At this time, the external memory may be connected to the PC 5 when the conveyance control system 1 is operated, such as performing the above-described first registration processing, the second registration processing, the confirmation processing, the conveyance processing, the print processing, or the like. Further, for example, the table 54A may be stored in a storage portion of another PC connected to the LAN 100. Of the storage portion of the other PC, an area in which the table 54A is stored may be set such that the area can be referred to from the outside. When the information of the table 54A is needed, the CPU 51 may read out the table 54A from the storage portion of the other PC via the LAN 100. Alternatively, for example, the table 54A may be stored in a storage portion of a storage server connected to a WAN on the outside of the LAN 100. When the information of the table 54A is needed, the CPU 51 may acquire the table 54A by communicating with the storage server via the WAN.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A conveyance control system comprising:
a first conveyor and a second conveyor configured to convey a platen;
a first printer provided in the first conveyor and configured to perform printing on a print medium held by the platen conveyed by the first conveyor;
a second printer provided in the second conveyor and configured to perform printing on the print medium held by the platen conveyed by the second conveyor;
a conveyance controller communicably connected to the first printer and the second printer on the basis of a predetermined communication protocol, and configured to control the first conveyor and the second conveyor; and
a storage configured to store first printer identification information and first conveyance identification information in association with each other, and to store second printer identification information and second conveyance identification information in association with each other, the first printer identification information being configured to identify the first printer on the basis of the communication protocol, the first conveyance identification information being configured to identify the first conveyor, the second printer identification information being configured to identify the second printer on the basis of the communication protocol, and the second conveyance identification information being configured to identify the second conveyor,
wherein
when the first printer performs the printing, the conveyance controller acquires, from the storage, the first conveyance identification information associated with the first printer identification information, and causes the first conveyor to convey the platen on the basis of the acquired first conveyance identification information, and
when the second printer performs the printing, the conveyance controller acquires, from the storage, the second conveyance identification information associated with the second printer identification information, and causes the second conveyor to convey the platen on the basis of the acquired second conveyance identification information.

2. The conveyance control system according to claim 1, further comprising:
a first sensor configured to detect a presence of the platen in the first printer,
wherein
when the platen is detected by the first sensor, the first printer transmits the first printer identification information to the conveyance controller.

3. The conveyance control system according to claim 2, wherein
the conveyance controller causes the first conveyor to convey the platen, and
after causing the first conveyor to convey the platen, the conveyance controller stores, in the storage, the first printer identification information and the first conveyance identification information in association with each other, in accordance with receiving the first printer identification information from the first printer.

4. The conveyance control system according to claim 2, wherein
the conveyance controller causes the first conveyor to convey the platen, and after causing the first conveyor to convey the platen, when the first printer identification information is received from the first printer, the conveyance controller compares the first printer identification information stored in the storage in association with the first conveyance identification information, with the first printer identification information received from the first printer.

5. The conveyance control system according to claim 1, further comprising:
a second sensor configured to detect the presence of the platen in the second printer includes,
wherein
when the platen is detected by the second sensor, the second printer transmits the second printer identification information to the conveyance controller.

6. The conveyance control system according to claim 1, further comprising:
a third conveyor, a printer being providable in the third conveyor, and the third conveyor being configured to convey the platen,
wherein
the conveyance controller causes the third conveyor to convey the platen, and
after causing the third conveyor to convey the platen, when the printer identification information configured to identify the printer on the basis of the communication protocol is not received, the conveyance controller does not store third conveyance identification information configured to identify the third conveyor in the storage in association with the printer identification information.

7. The conveyance control system according to claim 1, further comprising:
a display,
wherein
the conveyance controller causes the display to display a related image, a first input area used to input the first printer identification information, and a second input area used to input the second printer identification information, the related image being an image in which a first printer image indicating the first printer is associated with a first conveyance image indicating the first conveyor and in which a second printer image indicating the second printer is associated with a second conveyance image indicating the second conveyor,
the conveyance controller stores, in the storage, the first printer identification information input to the first input area, in association with the first conveyance identification information and
the conveyance controller stores, in the storage, the second printer identification information input to the second input area, in association with the second conveyance identification information.

8. The conveyance control system according to claim 7, wherein
the conveyance controller displays the first input area in a first position at which a distance from the first printer image is shorter than a distance from the second printer image, and displays the second input area in a second position at which a distance from the second printer image is shorter than a distance from the first printer image.

9. The conveyance control system according to claim 1, further comprising:
an applicator configured to apply a pretreatment agent on the print medium before printing by the printer, wherein
the storage further stores applicator identification information configured to identify the applicator on the basis of the communication protocol.

10. A non-transitory computer-readable medium storing computer-readable instructions executed by a computer, the computer being communicably connected to a first working instrument and a second working instrument on the basis of a predetermined communication protocol, and controlling a first conveyor and a second conveyor,
the first working instrument being a printer, a sewing machine, or a machine tool provided in the first conveyor conveying a holder holding a target object and being configured to perform processing on the target object held by the holder conveyed by the first conveyor, and
the second working instrument being a printer, a sewing machine, or a machine tool provided in the second conveyor conveying the holder and being configured to perform processing on the target object held by the holder conveyed by the second conveyor,
the holder being a platen when the first and the second working instrument are a printer, an embroidery frame when the first and the second working instrument are a sewing machine, or a table when the first and the second working instrument are a machine tool,
the instructions, when executed by the computer, causing the computer to perform processes comprising:
acquiring, when the first working instrument performs processing, first conveyance identification information associated with first working instrument identification information, from a storage, and causing the first conveyor to convey the holder on the basis of the acquired first conveyance identification information, the storage storing the first working instrument identification information configured to identify the first working instrument on the basis of the communication protocol in association with the first conveyance identification information configured to identify the first conveyor, and storing second working instrument identification information configured to identify the second working instrument on the basis of the communication protocol in association with second conveyance identification information configured to identify the second conveyor; and
acquiring, when the second working instrument performs processing, the second conveyance identification information associated with the second working instrument identification information, from the storage, and causing the second conveyor to convey the holder on the basis of the acquired second conveyance identification information.

11. A conveyance controller communicably connected to a first working instrument and a second working instrument on the basis of a predetermined communication protocol, and controlling a first conveyor and a second conveyor, the first working instrument being a printer, a sewing machine, or a machine tool provided in the first conveyor conveying a holder holding a target object and being configured to perform processing on the target object held by the holder conveyed by the first conveyor,
and the second working instrument being a printer, a sewing machine, or a machine tool provided in the second conveyor conveying the holder, and being configured to perform processing on the target object held by the holder conveyed by the second conveyor,
the holder being a platen when the first and the second working instrument are a printer, an embroidery frame when the first and the second working instrument are a sewing machine, or a table when the first and the second working instrument are a machine tool, the conveyance controller performing processes comprising:

acquiring, when the first working instrument performs processing, first conveyance identification information associated with first working instrument identification information, from a storage, and causing the first conveyor to convey the holder on the basis of the acquired first conveyance identification information, the storage storing the first working instrument identification information configured to identify the first working instrument on the basis of the communication protocol in association with the first conveyance identification information configured to identify the first conveyor and storing second working instrument identification information configured to identify the second working instrument on the basis of the communication protocol in association with second conveyance identification information configured to identify the second conveyor; and acquiring, when the second working instrument performs processing, the second conveyance identification information associated with the second working instrument identification information, from the storage, and causing the second conveyor to convey the holder on the basis of the acquired second conveyance identification information.

\* \* \* \* \*